May 14, 1935.   L. R. BUCKENDALE   2,001,239
SLACK ADJUSTER
Filed Aug. 31, 1933
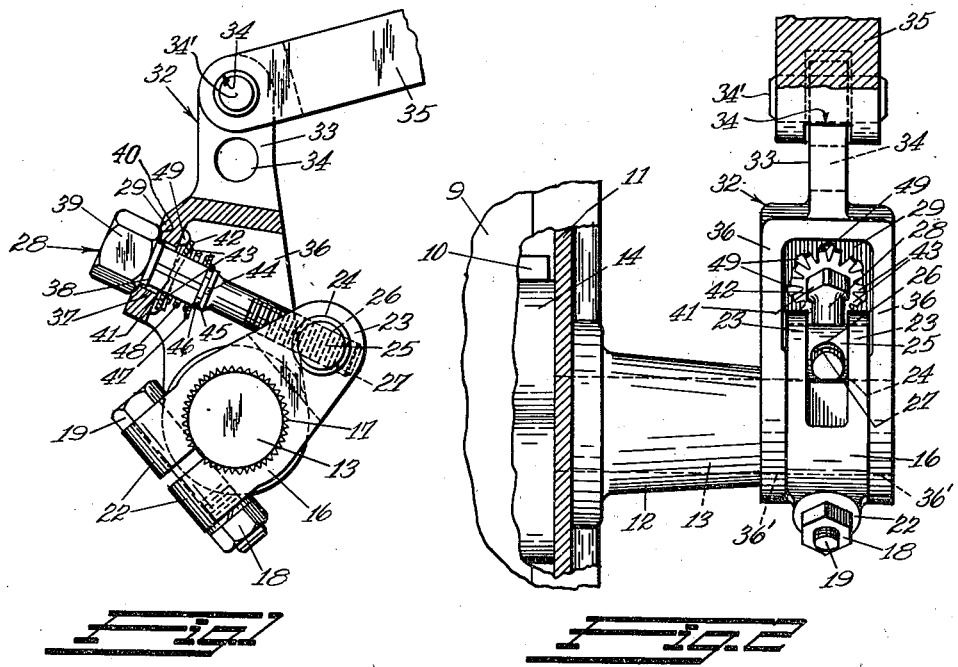
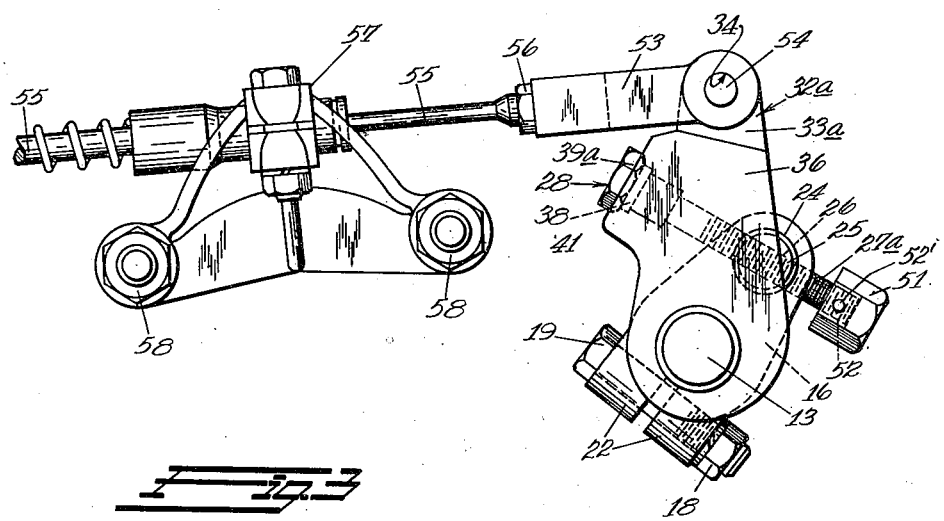
Inventor
Laurence R. Buckendale
By  Strauch & Hoffman
     Attorneys Patented May 14, 1935

2,001,239

UNITED STATES PATENT OFFICE 2,001,239

SLACK ADJUSTER

Laurence R. Buckendale, Detroit, Mich., assignor to The Timken-Detroit Axle Company, Detroit, Mich., a corporation of Ohio Application August 31, 1933, Serial No. 687,687

11 Claims. (Cl. 188—196)

This invention relates to mechanisms wherein two members are relatively adjustable for the purpose of taking up play or compensating for wear. More specifically the present invention is concerned with slack-adjusting mechanisms for association with operable parts of automotive vehicles and particularly for association with brakes and the operating means therefor.

As is well known, brakes of the internal expanding type employ a brake drum carried by the wheel hub and two arcuate movable brake shoes which are pivoted at one end on the stationary cover portion of the brake drum, and which contact a cam member at their other ends. This cam member is mounted on a shaft which extends outwardly through the brake cover member and has secured on its protruding end an operating mechanism that is operable, by means of any one of several well known actuating mechanisms, at the will of the driver of the vehicle.

After the brake shoes have been in use and begin to wear the cam, which forces the shoes into engagement with the rotating drum against the action of the usual springs associated with such devices, is not capable of spreading the brake shoes far enough to obtain proper braking of the vehicle. This is due to the inability of the actuating mechanisms to cause sufficient rotation of the cam. Many devices have been proposed to overcome this fault, including one which comprises a mechanism for rotating the cam with respect to the cam shaft operating mechanism.

The prior devices of this character, however, have not proved entirely satisfactory, chiefly because of their complexity and the difficult manner in which they have to be manipulated to accomplish the results required of them.

It is therefore a primary object of the present invention to provide a slack adjuster that is of simple and inexpensive design, and easily and accurately adjustable.

A further object of the present invention resides in the provision of a brake slack adjuster of the character above referred to embodying operating means which require a minimum of labor in order to accomplish the desired brake adjustment.

A still further object of the present invention is the provision of a slack adjuster which may be operated without the necessity of a wrench or other tool and which is automatically locked in adjusted position.

Another object of this invention is to provide a slack adjuster with automatic means for aligning and locking the adjusting element in any desired adjusted position.

The above objects and others will appear in the annexed specification when studied in connection with the appended claims and accompanying drawing, wherein:

Figure 1 is a side elevational view, in partial vertical section, of one preferred embodiment of this invention.

Figure 2 is an end view showing the device of Figure 1 associated with a brake mechanism of conventional construction, and as seen when looking toward the right hand side of Figure 1.

Figure 3 is an elevational view of another form of the present invention wherein the brake mechanism operates in a modified manner.

With continued reference to the drawing wherein like reference characters indicate like parts through the several figures and with particular reference for the present to Figure 2, 9 indicates a brake drum of a type well known in the art. This drum is provided with the usual brake shoes 10 and with a closure member 11 of the usual construction. Closure member 11 is suitably designed to rigidly support an elongated bearing member or shaft support 12. Journalled within support 12 is an actuating shaft 13, which at its inner end carries a brake actuating cam 14 that is integral therewith or otherwise suitably secured thereto. Cam 14 is of the type usually used in internal expanding brake mechanisms. Since the operation of these brakes is well known and forms no part of the present invention a detailed description thereof will be omitted.

Secured to the other end of shaft 13 is the slack adjusting mechanism comprising the present invention. Since the device is readily interchangeable it will be necessary to describe only one of the mechanisms. The device comprises an arm 16 suitably secured to shaft 13. In the preferred form arm 16 is provided with a serrated portion 17 which is adapted to encircle the shaft 13 and grip the same when nut 18 of bolt 19 is tightened to cause the split ears 22 of arm 16 to be forced together around shaft 13. The above described securing means ensures rotation of shaft 13 when arm 16 is caused to rotate.

Arm 16 is further provided with spaced ears 23, which as seen from Figure 1, are formed directly opposite the ears 22 and lie at an angle to a vertical plane passing through the longitudinal axis of shaft 13. The ears 23 are suitably apertured at 24 to receive a pin 25. This pin is adapted to rotate freely within apertures 24 for a purpose which will presently appear, and is provided with a threaded aperture 26 equally spaced from its ends. When the pin is in its assembled relation with ears 23 the threaded aperture 26 lies between said ears 23 and is equally spaced therefrom to receive the threaded end 27 of an adjusting bolt 28. The other end of bolt 28 is suitably journalled, in a manner to be hereinafter described, in an aperture in bridge portion 29 of a yoke member designated generally by numeral 32, which is adapted to embrace lever 16 and freely rotate on shaft 13.

The yoke 32 comprises a centrally disposed ear 33 which is provided with suitable apertures 34 which allow optional brake leverage in a manner clear to one skilled in the art. A pin or rivet 34' pivotally connects ear 33 with the rod 35. This rod 35 represents only conventional or applicable device for transmitting actuating forces to the brake operating mechanism. Ordinarily the rod will be operable by a power device such as an air-brake motor, but it may also represent the usual link that is utilized in the type of automotive brake wherein a separate rock shaft is provided that lies in the plane of the axle and is connected by brake rods to a point in alignment with the universal joint of the drive shaft and wherein the brake operating force is transmitted by a push on link 35. Spaced legs 36 are formed integrally with bridge 29 and are suitably apertured at 36' to freely receive the outer end of shaft 13. Due to this construction of legs 36 it will be seen that yoke 32 is free to rotate about shaft 13 as previously described but is prevented from lateral displacement thereon by reason of the legs 36 being in contact with lever 16 which is positively secured to shaft 13.

Bolt 28, as previously pointed out, is journalled in an aperture 37 in bridge 29. Aperture 37 is of sufficient diameter to freely receive annular portion 38 of bolt 28. Bolt 28 is further provided with a head 39 which is spherical in shape at 40 on its under side providing a continuation of surface 38 so that bolt 28 engages bridge 29 complementally with a minimum of friction and is free to rotate with respect to bridge 29. Due to this bearing arrangement, bolt 28 is capable of assuming varying degrees of angularity with respect to bridge 29 in response to swinging movement of the lever 16, without causing binding of the bolt at its contact with the bridge. Pin 25 is adapted to swivel in ears 23 of lever 16 as previously described in order that bolt 28 will not receive undesirable twisting forces at this point. It is also evident that this swivelling action of pin 25 will at all times prevent binding of the threads of bolt 28 with threaded aperture 26. Squared portion 41 of bolt 28 is adapted to receive a novel locking mechanism comprising a lock washer 42 which fits snugly on squared portion 41 and is constrained to rotate with bolt 28 when the latter is rotated for taking up the play occasioned by wear of the brake shoes. Washer 42 is provided with peripheral latching formations comprising a plurality of independent fingers 43 for a purpose to be hereinafter described.

Squared portion 41 has its corners flattened at 44 and is provided with an annular groove 45 of a diameter approximating the width of the flat sides of bolt 28. A retaining ring 46 is received in groove 45 and maintains a washer 47 upon squared portion 41 of bolt 28. Due to the above described construction it is apparent that ring 46 is seated in groove 45 only at the corners of squared portion 41 and projects outwardly beyond the flat portions of bolt 28 to form a surface of maximum area for contact with washer 47. A spring 48 is retained between washer 47 and lock washer 42 and urges lock washer 42 toward bridge 29. Bridge 29 is furthermore provided with suitable rivet heads 49 on its under side. Rounded heads 49 cooperate with fingers 43 of washer 42 and, due to the action of spring 48 urging washer 42 toward bridge 29, provides suitable yieldable locking means for preventing bolt 28 from shaking loose from its adjusted position. Other equivalent means may be substituted for the washer 42 such, for example, as a collar having radial indentations or recesses.

It has been found that by using a spring that is not exceedingly strong that sufficient resistance is maintained to prevent bolt 28 from undesirable rotation while adjustment of the device may conveniently be made without the use of a wrench or other tool. This feature greatly enhances the operation of the slack adjuster since it is not necessary to grope around with a wrench in order to make the required adjustment. It is furthermore unnecessary for the attendant to secure a wrench for locking the device in adjusted position since the novel locking mechanism associated with this invention automatically locks the device in adjusted position. This automatic lock obviates the possibility of the attendant failing to lock the take-up device of any one of the brakes when an adjustment is made, thereby causing unequal braking and possibly serious accidents.

The pin 25 and bolt 28 preferably are formed of Udylite or chrome plate to provide surfaces that will not become rusted or indented and that will remain clean so as not to develop greater friction than can be overcome readily. For the same reason, the parts 42 and 49 and possibly some of the others in this and the modified form, preferably are likewise plated.

*Operation*

Assuming that the brake shoes are new and that the cam 14 under these conditions is positioned with its long axis parallel to the contacting ends of the shoes, when the cam 14 is rotated in the manner common to expanding brakes, the brakes will function properly. After a time the shoes wear and due to the fact that the actuating mechanism allows only sufficient rotation of cam 14 to operate the brakes properly when the shoes are new, the brakes will not engage in the desired manner. It is therefore desirable to cause cam 14 to have its long axis turned more or less towards a position perpendicular to its original position. This may be done by rotating the bolt 28 to the left as viewed in Figure 2. Due to the construction of the present invention this rotation may be accomplished by hand without the aid of a wrench or other tool. This counterclockwise rotation of nut 28 causes lever 16 to be drawn in toward bridge portion 29 of yoke 32. Lever 16 will be moved rather than yoke 32 since operating link 35 will prevent clockwise rotation of yoke 32. It is to be understood that the bolt 28 may be provided with a thumb or wing head in lieu of head 39 if so desired.

Due to the connection of lever 16 with shaft 13 through the means of serrated portion 17 and clamping bolt 19, shaft 13 will be rotated in a clockwise direction along with lever 16. Since cam 14 is keyed to shaft 13, the motion will be transferred to it, causing cam 14 to assume a position at a slight angle to its original position. Due to the new position of cam 14, actuation of brake link 35 will cause the cam to be rotated to a greater angular position than that previously obtained by actuation of said brake rods. This difference will be determined and limited by the amount that the cam is offset from its normal position by rotation of the slack take-up mechanism of this invention.

It is therefore seen that due to the rotation of the cam 14 in the above described manner, the long axis will cause the free ends of the brake shoes to be wedged further apart when the brake pedal is operated than before an adjustment of the slack take-up was made. Due to this further rotation, shoes 10 are forced into contact with the brake drum with the same pressure that existed when the shoes were new and not worn and no change in the length of the brake rods themselves is necessitated. It is apparent that the above described invention provides an adjuster for taking up the slack produced by the wear of the brake faces that may be very accurately adjusted, that is simple to operate and may be manufactured at a relatively small cost.

It is to be understood that although the present invention is described in connection with brake mechanisms of the usual type it is not limited to such use but may be employed in any case wherein it is desirable to rotate a shaft actuator with respect to the shaft and such embodiments are intended to be embraced by the claims.

Although the present modification has been described in conjunction with that type of brake wherein the operative force exerts a push towards the brake operating mechanism, it is to be understood that the present invention is capable of use with the type of brake operating mechanism wherein a pull is to be exerted upon the arm 32. Such a device is disclosed in the modification now to be described.

Modification

With continued reference to the drawing and particularly to Figure 3, wherein a modified form of device is disclosed, the same reference characters are used to designate like parts. The detailed description of said parts will be omitted and reference may be had to Figures 1 and 2 for said detailed description.

The device illustrated in Figure 3 is adapted to be used with that type of internal expanding brake wherein a pull is exerted by means of a brake cable. In this embodiment the construction is exactly the same as that shown in Figures 1 and 2 except that adjusting bolt 28 is provided with a slightly smaller head 39a, for a purpose to be hereinafter pointed out, and has a lengthened threaded portion 27a. Threaded portion 27a is provided with a nut 51 that is suitably tapped at 52 in order that it may be associated with portion 27a of bolt 28 in order to cause rotation of said adjusting bolt. Nut 51 is suitably secured to bolt 28 by a pin 52' passing through nut 51 and bolt 28.

A yoke member 32a of slightly modified form is associated in the manner described in connection with the embodiment disclosed in Figures 1 and 2. Member 32a has legs 36 exactly the same as the previously described legs 36 but is provided with an ear 33a which is provided with only one aperture 34. Ear 33a is connected to a bifurcated connector 53 by means of a pin 54.

Connector 53 is adapted to receive an operating cable 55 which is locked therein by nut 56. Cable 55 is associated with a guide member 57 which is suitably secured to the brake drum cover 11 by means of nut and bolt assemblies 58. Guide member 57 is of the usual construction used with cable operated brakes and since it forms no part of the present invention a detailed description thereof will be omitted.

Bolt head 39a is of slightly modified construction in the present embodiment of this invention because connector 53 is in such close proximity to head 39a that it is impossible to reach said head for adjusting the take-up mechanism. The mechanism of this modification is adjusted by means of the nut 51 which is clear of all other mechanism and is readily accessible.

Operation of modification

The operation of the modified form of the invention is the same as that described in connection with the preceding form except that adjustment of bolt 28 is made by means of nut 51 rather than head 39 as described in connection with the previous embodiment. Since in the present instance the pull exerted by cable 55 causes rotation of the cam 14 and the take-up mechanism in the same direction, it is thought that a detailed description thereof will be unnecessary.

It will be noted, however, that due to the fact that the cable operating connections will not prevent rotation of the lever 32a, it will be necessary to provide stops on the frame of the vehicle as is common in the art. Since these stops form no part of the present invention a showing and description of the same is thought unnecessary and is therefore omitted.

It will be seen that the present invention provides a take-up device that is simple and may be utilized in any instance where relative rotation of a shaft and a lever freely mounted thereon is desired. All such adaptations of the device disclosed in the present invention are intended to be embraced by the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A slack take-up mechanism comprising a shaft; operating means for the shaft including a member mounted freely on said shaft, a second member positively connected to said shaft, operating means for said first member, means for adjustably intercoupling said first and said second members, said adjustable means including an element screw-threadedly associated with one of said members and spring actuated means for locking said element against relative rotation with respect to one of said members.

2. In combination a brake drum; brake shoes for cooperation with said brake drum; a brake shoe operating cam; a shaft extending into said brake drum and carrying said brake operating cam; a slack take up mechanism carried by said shaft on its outwardly extending end; said slack take-up mechanism comprising a member freely rotatable about said shaft; a member positively secured to said shaft; adjustable means connecting said first and said second members; said means rotatably mounted in said first member and positively connected by a swivel connection to said second member; means automatically locking said adjustable member in adjusted position; said automatic locking means comprising a washer mounted for rotation with said adjustable means; means on said first mentioned member for cooperation with said washer; means carried by said adjustable means for urging said washer into cooperative relation with the means carried by said first mentioned member; and means carried by said adjustable means for maintaining the automatic locking means in assembled relation with said slack take-up mechanism.

3. In a brake slack adjuster, a shaft; a cam carried by said shaft; a freely rotatable member mounted on said shaft; a second member positively connected to said shaft; means connecting said first member and said second member; said means comprising a bolt provided with a lock washer; means carried by said freely mounted member comprising a multiplicity of protruding elements which cooperate with said lock washer for yieldably latching said first member and said second member in adjusted position.

4. The combination defined in claim 3 wherein the lock washer is provided with a plurality of peripheral formations cooperating with said protruding elements for locking said slack adjuster in adjusted position.

5. A slack take-up mechanism comprising a shaft, operating means for the shaft including a member mounted freely on said shaft; a second member positively connected to said shaft, operating means for said first member, means for adjustably intercoupling said first and said second members, said adjustable means including spring actuated locking means comprising a washer non-rotatably carried by said adjustable means, means carried by one of said members for latching cooperation with said washer, means urging said washer into contact with said cooperating means, and means for retaining the locking means in assembled relation.

6. A slack take-up mechanism comprising a shaft, operating means for the shaft including a member mounted freely on said shaft, a second member positively mounted on said shaft, operating means for said first member, means for adjustably coupling said first and second members comprising an element screw-threadedly associated with one of said members, a locking element axially slidably but non-rotatably connected with said element, engaging means on one of said members and resilient means for urging said locking element into engagement with said engaging means to lock said adjustable coupling means.

7. In a brake slack adjuster, a shaft, a freely rotatable member mounted on said shaft comprising a yoke member having arms journalled on said shaft, a second member non-rotatably fixed to said shaft between said arms, and means for adjustably setting said members angularly relative to each other, said means comprising a bolt extending loosely through one of said members into adjustable connection with the other and having a head universally seated against that member through which the bolt extends.

8. The combination as set forth in claim 7, wherein said adjustable connection comprises screw threaded means, and wherein there is resilient means associated with one of said members and said bolt for yieldingly holding said bolt against rotation.

9. In a slack take-up mechanism, a shaft, a pair of devices mounted on said shaft and affording a pair of radially arranged arms adapted for interconnection, one of said devices being freely rotatable with respect to the shaft and the other being non-rotatable with respect thereto, and means interconnecting said arms for angular adjustment, said means comprising an elongated assembly of complementally screw threaded elements that are axially adjustable to vary the effective length of the elongated assembly, one of said elements being provided with a spherically curved surface designed to seat universally in a complemental portion of one of said arms and otherwise being sufficiently spaced with respect to said last mentioned arm to permit universal movement with respect thereto.

10. In a slack take-up mechanism, a shaft, a pair of devices mounted on said shaft and affording a pair of radially arranged arms adapted for interconnection, one of said devices being freely rotatable with respect to the shaft and the other being non-rotatable with respect thereto, and means interconnecting said arms for angular adjustment, said means comprising a pin rotatably mounted in one of said arms substantially in parallelism with the shaft and having a screw threaded aperture, and a bolt having one end threaded in adjustable connection with said pin and its other end extending freely through the other arm and provided with an enlargement abutting said last mentioned arm on that side thereof which faces away from said pin, said bolt also having means for turning it to effect adjustment.

11. In a slack take-up mechanism, a shaft, a pair of devices mounted on said shaft and affording a pair of radially arranged arms adapted for interconnection, one of said devices being freely rotatable with respect to the shaft and the other being non-rotatable with respect thereto, and means interconnecting said arms for angular adjustment, said means comprising a pin rotatably mounted in one of said arms substantially in parallelism with the shaft and having a screw threaded aperture, and a bolt having one end threaded in adjustable connection with said pin and its other end associated with the other arm, said last mentioned arm having an apertured portion providing a curved seat, and said other end of the bolt being provided with a ball shaped surface fitted to said seat for universal movement and with an actuating portion disposed outwardly of said ball shaped surface for convenient manipulation.

LAURENCE R. BUCKENDALE.